(12) United States Patent
Baker et al.

(10) Patent No.: US 10,371,093 B2
(45) Date of Patent: Aug. 6, 2019

(54) AIRCRAFT NOZZLE WITH A VARIABLE NOZZLE AREA OF A SECOND FLOW PATH

(71) Applicant: Rolls-Royce North American Technologies, Inc., Indianapolis, IN (US)

(72) Inventors: Von D. Baker, Indianapolis, IN (US); Kenneth M. Pesyna, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 995 days.

(21) Appl. No.: 14/200,132

(22) Filed: Mar. 7, 2014

(65) Prior Publication Data

US 2015/0121889 A1    May 7, 2015

Related U.S. Application Data

(60) Provisional application No. 61/775,159, filed on Mar. 8, 2013.

(51) Int. Cl.
| | |
|---|---|
| *F02K 3/02* | (2006.01) |
| *F02K 1/06* | (2006.01) |
| *F02K 1/15* | (2006.01) |
| *F02K 1/12* | (2006.01) |

(52) U.S. Cl.
CPC ............ *F02K 3/02* (2013.01); *F02K 1/1215* (2013.01); *F02K 1/1246* (2013.01); *F02K 1/15* (2013.01); *F02K 1/06* (2013.01); *F05D 2250/10* (2013.01)

(58) Field of Classification Search
CPC .. F02K 1/00; F02K 1/06; F02K 1/12–1/1292; F02K 1/15; F02K 1/36; F02K 1/763; F02K 3/02; F02K 3/025; F02K 3/077; F02K 3/075; F05D 2250/10
See application file for complete search history.

(56) References Cited

U.S. PATENT DOCUMENTS

| | | | | |
|---|---|---|---|---|
| 3,038,304 A | * | 6/1962 | Alford | F02K 1/1269 239/265.41 |
| 3,163,000 A | * | 12/1964 | Morley | F02K 1/1223 60/242 |
| 3,261,164 A | * | 7/1966 | Tumicki | F02K 1/06 239/265.37 |
| 3,730,436 A | * | 5/1973 | Madden | F02K 1/12 239/265.39 |
| 4,043,509 A | * | 8/1977 | McHugh | F02K 1/1269 239/265.41 |
| 4,930,308 A | | 6/1990 | Fage | |

(Continued)

*Primary Examiner* — William H Rodriguez
*Assistant Examiner* — Jason H Duger
(74) *Attorney, Agent, or Firm* — Barnes & Thornburg LLP

(57) ABSTRACT

A nozzle for an aircraft powerplant is disclosed which provides two separate flow paths. A flow path is provided in the nozzle for a core flow of the powerplant and another flow path is provided for a bypass flow of the powerplant. The nozzle can have a variety of configurations including, but not limited to, 2D and axisymmetric. Either or both the flow paths can be convergent, divergent, or convergent-divergent, and the flow paths need not be similar between the two. Actuators are provided to manipulate the configuration of the flow paths and the areas of the flow paths. For example, throat and/or exit areas can be manipulated.

19 Claims, 6 Drawing Sheets

(56) References Cited

U.S. PATENT DOCUMENTS

| | | | |
|---|---|---|---|
| 5,120,005 A * | 6/1992 | Reedy | B64C 9/32 239/265.39 |
| 5,351,888 A * | 10/1994 | Taylor | B64D 33/08 239/127.3 |
| 5,428,954 A | 7/1995 | Cowan, Sr. | |
| 6,195,981 B1 * | 3/2001 | Hanley | F02K 1/008 239/265.35 |
| 6,751,944 B2 | 6/2004 | Lair | |
| 6,971,229 B2 | 12/2005 | Lair | |
| 7,469,529 B2 | 12/2008 | Feuillard et al. | |
| 7,600,384 B2 | 10/2009 | Chanez et al. | |
| 7,681,399 B2 | 3/2010 | Orlando et al. | |
| 2007/0163230 A1 | 7/2007 | Dussillols et al. | |
| 2012/0255806 A1 * | 10/2012 | Pilon | F02K 1/1223 181/215 |
| 2016/0003187 A1 * | 1/2016 | Roberge | F02K 3/02 415/1 |

* cited by examiner

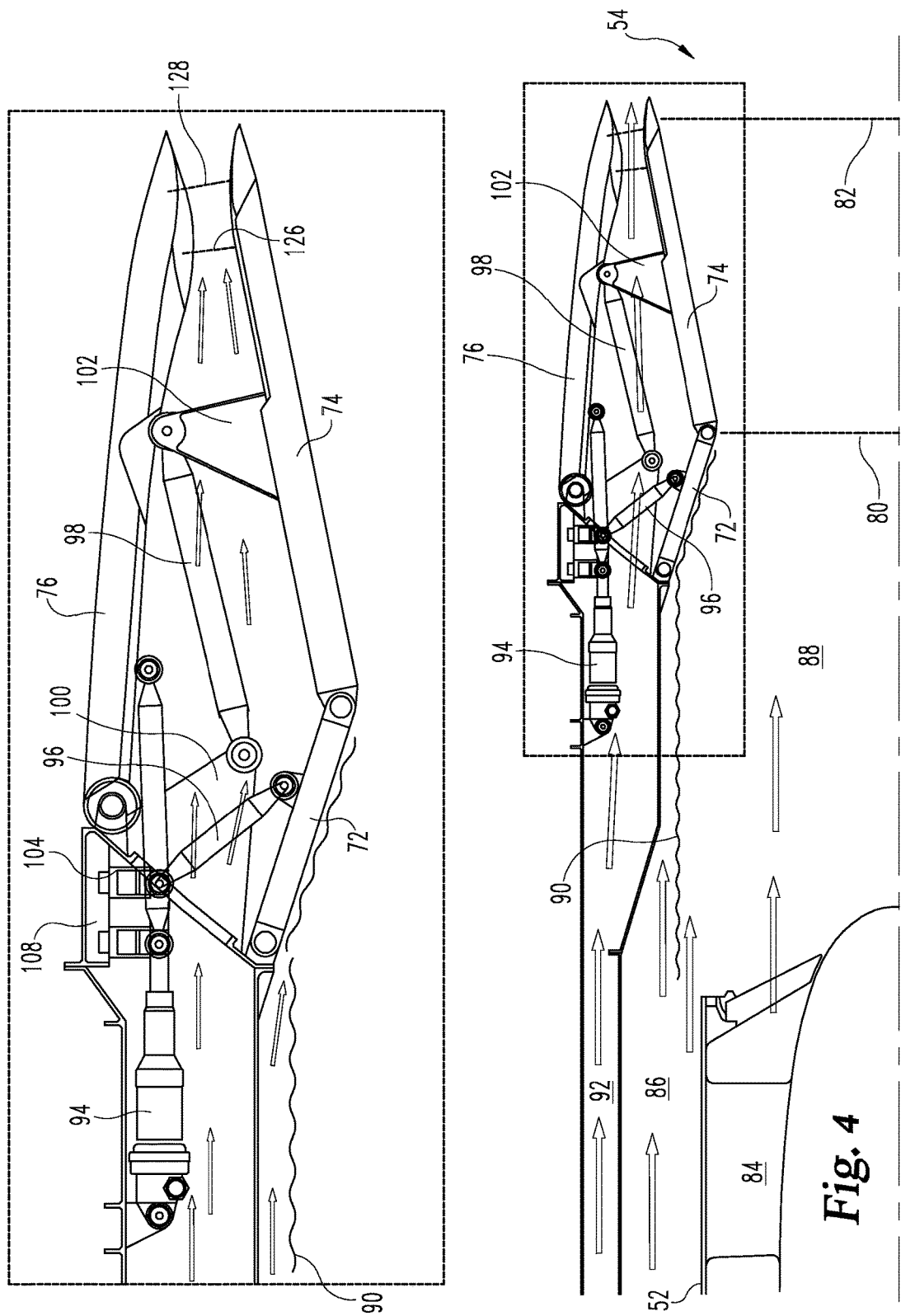

AIRCRAFT NOZZLE WITH A VARIABLE NOZZLE AREA OF A SECOND FLOW PATH

CROSS REFERENCE TO RELATED APPLICATIONS

This application claims priority to and the benefit of U.S. Provisional Patent Application No. 61/775,159, filed 8 Mar. 2013, the disclosure of which is now expressly incorporated herein by reference.

GOVERNMENT RIGHTS

The present application was made with the United States government support under Contract No. FA8650-07-C-2803. The United States government may have certain rights in the present application.

TECHNICAL FIELD

The present disclosure generally relates to aircraft powerplants. More particularly, but not exclusively, the present disclosure relates to variable nozzles used in aircraft powerplants.

BACKGROUND

The ability to extract an airflow from a powerplant and combine that airflow with a flow, such as a core flow or a flow that includes a core flow, of the powerplant remains an area of interest. Some existing systems have various shortcomings relative to certain applications. Accordingly, there remains a need for further contributions in this area of technology.

SUMMARY

One embodiment of the present disclosure is a unique aircraft powerplant. Other embodiments include apparatuses, systems, devices, hardware, methods, and combinations for combining flows of the aircraft powerplant. Further embodiments, forms, features, aspects, benefits, and advantages of the present application shall become apparent from the description and figures provided herewith.

BRIEF DESCRIPTION OF THE FIGURES

FIG. 4 depicts an embodiment of components of a nozzle.

DETAILED DESCRIPTION OF THE ILLUSTRATIVE EMBODIMENTS

Figure 1:
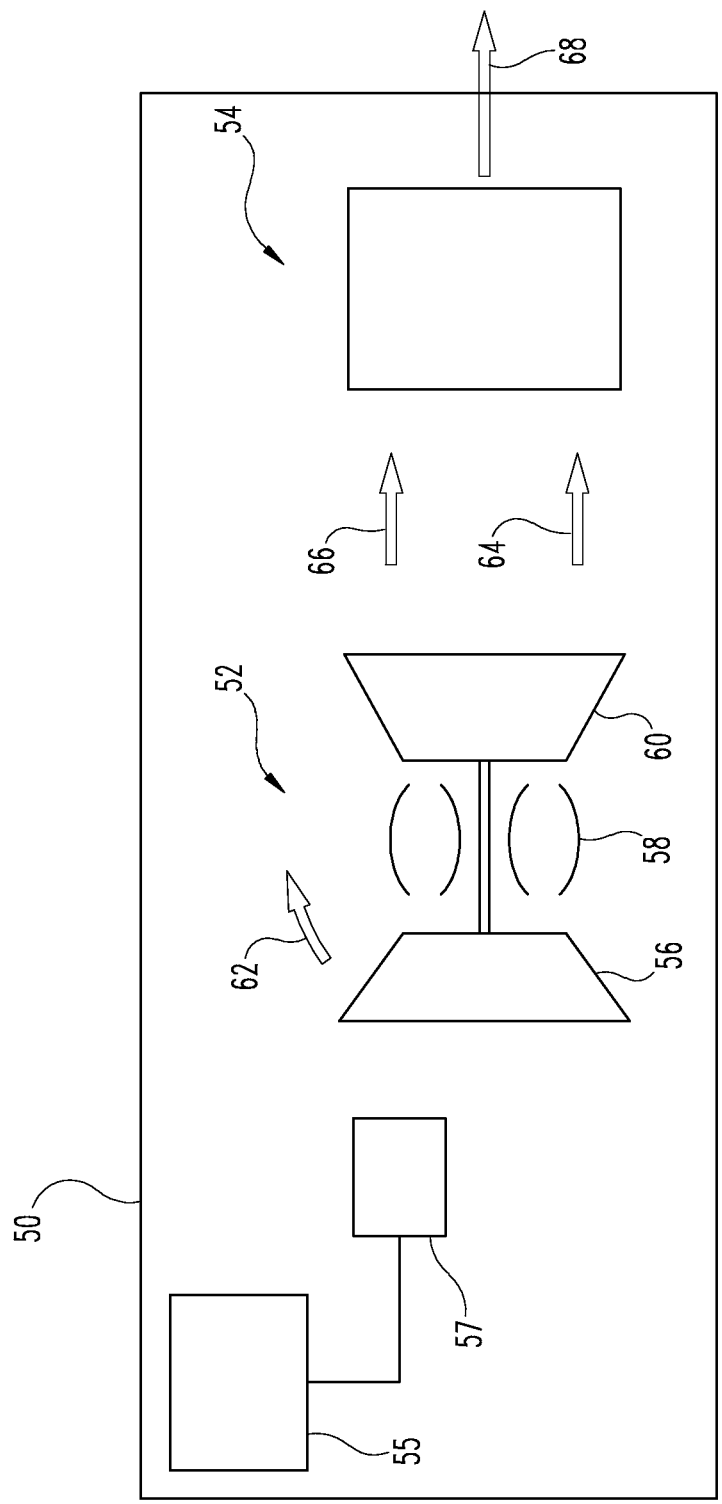
FIG. 1 depicts an embodiment of a gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, one embodiment of the present application depicts an aircraft 50 having a gas turbine engine 52 and a nozzle 54. As used herein, the term "aircraft" includes, but is not limited to, airplanes, unmanned space vehicles, fixed wing vehicles, variable wing vehicles, unmanned combat aerial vehicles, tailless aircraft, and other airborne and/or extraterrestrial (spacecraft) vehicles such as, but not limited to, a two-stage to orbit vehicle that includes an air-breathing first stage. Further, the present disclosures are contemplated for utilization in other applications that may be known to one of ordinary skill in the art. The aircraft 50 can be operated at a variety of speeds and includes a sensor 55 and a controller 57.

The sensor 55 measures aircraft flight condition such as speed and altitude, to set forth just two non-limiting examples, and can output any variety of data whether sensed or calculated. For example, the sensor 55 can sense and output conditions such as static temperature, static pressure, total temperature, and/or total pressure, among possible others. In addition, the flight condition sensor 55 can output calculated values such as, but not limited to, equivalent airspeed, altitude, and Mach number. Any number of other sensed conditions or calculated values can also be output. The flight condition sensor 55 provides data to the controller 57 and can output values in either analog or digital form.

The controller 57 is provided to monitor and control engine operations. The controller 57 can be comprised of digital circuitry, analog circuitry, or a hybrid combination of both of these types. Also, the controller 57 can be programmable, an integrated state machine, or a hybrid combination thereof. The controller 57 can include one or more Arithmetic Logic Units (ALUs), Central Processing Units (CPUs), memories, limiters, conditioners, filters, format converters, or the like which are not shown to preserve clarity. In one form, the controller 57 is of a programmable variety that executes algorithms and processes data in accordance with operating logic that is defined by programming instructions (such as software or firmware). Alternatively or additionally, operating logic for the controller 57 can be at least partially defined by hardwired logic or other hardware. In one particular form, the controller 57 is configured to operate as a Full Authority Digital Engine Control (FADEC); however, in other embodiments, it may be organized/configured in a different manner as would occur to those skilled in the art. It should be appreciated that controller 57 can be used in the regulation/control/activation of one or more subsystems or aspects of the aircraft 50, including but not limited to exclusive control of the nozzle 54 and associated actuation equipment.

The gas turbine engine 52 is capable of operating at a variety of conditions and can take a number of forms, such as, but not limited to, a turbofan engine. In the illustrative embodiment, the gas turbine engine 52 is depicted as a single spool engine having a compressor 56, a combustor 58, and a turbine 60. In other embodiments, however, the gas turbine engine can have any number of spools. The gas turbine engine 52 can be at least one of an adaptive cycle or variable cycle engine and can incorporate continuous or discontinuous combustion systems. The illustrative embodiment is only one form of a gas turbine engine suitable for use in the present application.

Illustrated in FIG. 1 is an air flow 62 that bypasses a core of the gas turbine engine. In one form, the air flow 62 can be a bypass flow from a fan of the gas turbine engine. Such bypass flow can result in a high bypass ratio or a low bypass ratio turbofan engine. In another embodiment, the air flow 62 can be an offtake flow, such as an offtake from a fan flow of the gas turbine engine. In some embodiments, the offtake flow can be referred to as third stream flow. Such an offtake flow can be used to accommodate adaptive engine features of the gas turbine engine 52 and/or can be used for other purposes such as aircraft anti-icing needs, cabin pressurization, engine anti-icing needs, bearing seal buffering, and turbine cooling, to set forth just a few non-limiting examples. The offtake flow can accommodate a wide range of flows including, but not limited to, up to 50% of total inlet flow to the gas turbine engine 52. In some forms, the offtake flow can be 10%.

The nozzle 54 is capable of receiving an engine flowstream 64 that includes a core flow of the gas turbine engine as well as a bypass stream 66 from the air flow 62. The bypass stream 66 can include the entirety of the air flow 62 discussed above, but, in some embodiments, may only include a portion of the air flow 62. The nozzle 54 can be used to combine the engine flowstream 64 and the bypass stream 66 to create an exhaust stream 68. Though the nozzle 54 is depicted inside the schematic representation of the aircraft 50, it will be understood that the nozzle 54 can be located anywhere relative to the aircraft 50 whether embedded or exposed to an airflow exterior to the aircraft 50.

Figure 2:
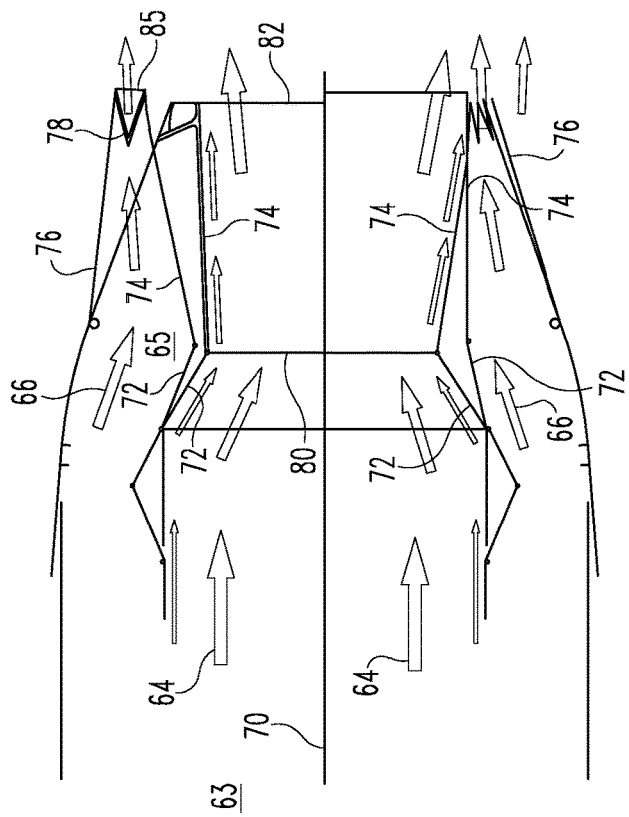
FIG. 2 depicts an embodiment of a nozzle.

Turning now to FIG. 2, one embodiment of the nozzle 54 can be seen in which the engine flow stream 64 and the bypass stream 66 enter the nozzle 54 on an upstream side. The nozzle 54 can be a 2D nozzle or an axisymmetric nozzle, depending on the needs of any given application. FIG. 2 depicts the nozzle 54 having two different configurations of its mechanical arrangement above a reference line 70, while another set of configurations of its mechanical arrangement is depicted below the line 70. The top configuration of the two above the reference line 70 represents a configuration of the nozzle 54 in maximum afterburner in supersonic flight. The bottom configuration of the two above the reference line 70 represents the nozzle 54 in subsonic cruise. The bottom configuration of the two below the reference line 70 represents the nozzle 54 in another maximum afterburner configuration and the upper configuration of the two below the reference line 70 represents the nozzle 54 in transonic max dry power.

It will be understood that the nozzle 54 can have any one of the depicted configurations reflected on both sides of the reference line 70. For example, if the nozzle 54 is a 2D nozzle, the upper side can be a mirror image of the lower side. As used herein, the terms "upper", "lower", "top" and "bottom" are used only for ease of description purposes of the embodiment as illustrated in FIG. 2 and are not intended to otherwise limit the arrangement of the nozzle 54 with respect to any given aircraft implementation.

If the nozzle 54 is an axisymmetric nozzle then the configuration of the nozzle mechanical arrangement can be circumferentially the same around the nozzle 54. For example, an axisymmetric embodiment of the nozzle 54 can be placed in one of the configurations depicted above the reference line 70 in one mode of operation, and then placed in another configuration, such as one of the configurations depicted below the reference line 70, in another mode of operation. Various other configurations are possible other than those depicted in FIG. 2, as will be described further below.

The nozzle 54 includes an engine flow passage 63 for the engine flow stream 64 and a bypass flow passage 65 for the bypass stream 66. Either or both the engine flow passage 63 and the bypass flow passage 65 can be a convergent passage, a divergent passage, or a convergent-divergent (CD) flow passage. The configurations need not be the same between the separate flow passages. To set forth just a few non-limiting examples, the nozzle 54 can have one of the engine flow passage 63 and the bypass flow passage 65 be a convergent passage and the other a CD passage. The nozzle 54 can also have both the engine flow passage 63 and the bypass flow passage 65 be CD passages. It is also possible that the passages 63 and 65 can have a configuration in one mode of operation and another configuration in a different mode of operation. For example, at one flight condition one or both passages 63 and 65 can be a convergent passage while at another flight condition one or both can be a CD passage. The nozzle 54 described herein can be used with a variable cycle turbine engine where flow management of various engine streams provides for optimized engine thrust and specific fuel consumption over a wide range of operating conditions. The passages 63 and 65 can have any variety of geometries including, but not limited to, the geometries and combinations discussed above.

The present disclosure includes means for synchronizing a plurality of first flaps of a first nozzle component, wherein the means corresponds to an actuation ring, such as unison ring 104. The present disclosure includes means for coordinating a motion of a plurality of second flaps of a second flow nozzle component independently relative to a first nozzle component, wherein the means corresponds to an actuation ring, such as unison ring 116.

Each of the passages 63 and 65 include nozzle members that are capable of moving and altering a flow direction and/or flow area of the passages 63 and 65. In some embodiments of the nozzle 54, either or both passages 63 and 65 can include a plurality of members. In some embodiments, a given nozzle member may form part of both the passages 63 and 65. In the illustrative embodiment, the engine flow passage 63 includes an exhaust upstream member 72 and an exhaust downstream member 74 which are capable of articulating with respect to one another. Though only two members are depicted in the illustrative embodiments, fewer or greater numbers of members can be present in other embodiments.

Furthermore, the exhaust members 72 and 74 can be unitary members or can be an assembly of components. In one of the configurations depicted above the reference line 70, the exhaust upstream member 72 forms part of a convergent flow path and the exhaust downstream member 74 forms part of a divergent flow path. It will be appreciated, however, that the exhaust members 72 and 74 can be capable of movements to form any variety of nozzle configurations as discussed herein. The exhaust upstream member 72 and exhaust downstream member 74 can be any variety of sizes, shapes, and numbers.

To set forth just a few comments on the axisymmetric nozzle configuration, multiple exhaust members 72 and 74 can be used and placed circumferentially around the nozzle 54. In some forms, the exhaust members 72 and 74 can have a rounded surface over which the engine flow stream 64 passes, but not all forms need have rounded surfaces. Furthermore, the exhaust members 72 and 74 need not be the same shape at each location around the circumference of the nozzle 54. With respect to a 2D nozzle configuration, any number of exhaust members 72 and 74 can be used and can have any variety of sizes and shapes.

Also as shown in the illustrative embodiment, the bypass flow passage 65 is formed on one side by a bypass member 76 and on another side by the cold side flow surfaces of the exhaust members 72 and 74. Though only one member is depicted in the illustrative embodiment on the radially outer side of the bypass flow passage 65, greater numbers of members can be present in other embodiments. Furthermore, the bypass member 76 can be a unitary member or can be an assembly of components. The bypass member 76 can be any variety of sizes and shapes. To set forth just a few comments on the axisymmetric nozzle configuration, multiple bypass members 76 can be used and placed circumferentially around the nozzle 54. In some forms, the bypass members 76 can have a rounded surface over which the engine flow stream 64 passes, but not all forms need have rounded surfaces. Furthermore, the bypass members 76 need not be the same shape at each location around the circumference of the nozzle 54. With respect to a 2D nozzle configuration, any number of bypass members 76 can be used and can have any variety of sizes and shapes.

The bypass member 76 is depicted as coupled to the exhaust downstream member 74 near the trailing ends of each via a mechanical link 78 in the illustrative embodiment. Though the mechanical link 78 is shown as a pivoting linkage, some embodiments need not be capable of such movement. The mechanical link 78 can be used to manipulate the relative locations or orientations of the bypass member 76 and exhaust downstream member 74. In some forms, the link 78 can be used to manipulate one of the bypass member 76 and exhaust downstream member 74 independent of the other, but, in other forms, the members 74 and 76 may be dependent on each other. Not all embodiments of the nozzle 54 need include a mechanical link 78.

Each of the engine flow passage 63 and bypass flow passage 65 has variable area control made possible via movement of one or more of the members 72, 74, and 76. In the illustrative embodiment, the engine flow passage 63 includes an engine throat area 80 (which can be referred to as A8) and an engine exit area 82 (which can be referred to as A9), depending on the configuration of the passage 63. The illustrative embodiment also depicts the bypass flow passage 65 as having a bypass exit area 85 (which can be referred to as A19). In some embodiments, the bypass flow passage 65 can also have a throat area which can be referred to as A18, one embodiment of which will be described below.

Figure 3:
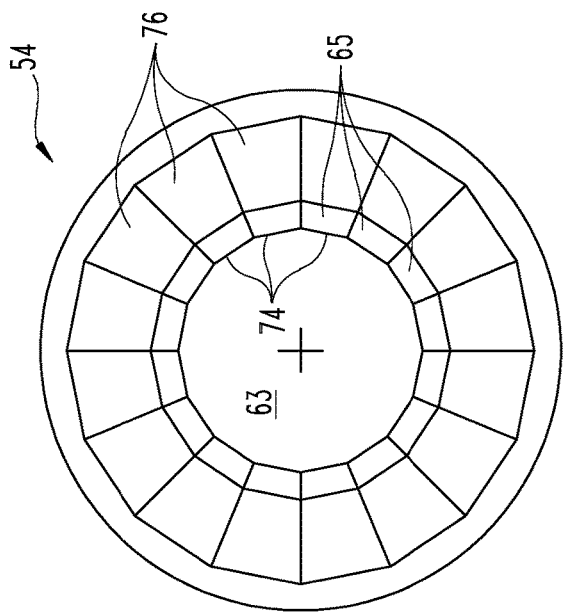
FIG. 3 depicts an embodiment of a nozzle.

Turning now to FIG. 3, an end view of one embodiment of the nozzle 54 is depicted. The illustrative form is of an axisymmetric nozzle having a plurality of members 74 and 76. Also shown in the figure are the engine flow passage 63 and bypass flow passage 65.

Figure 5:
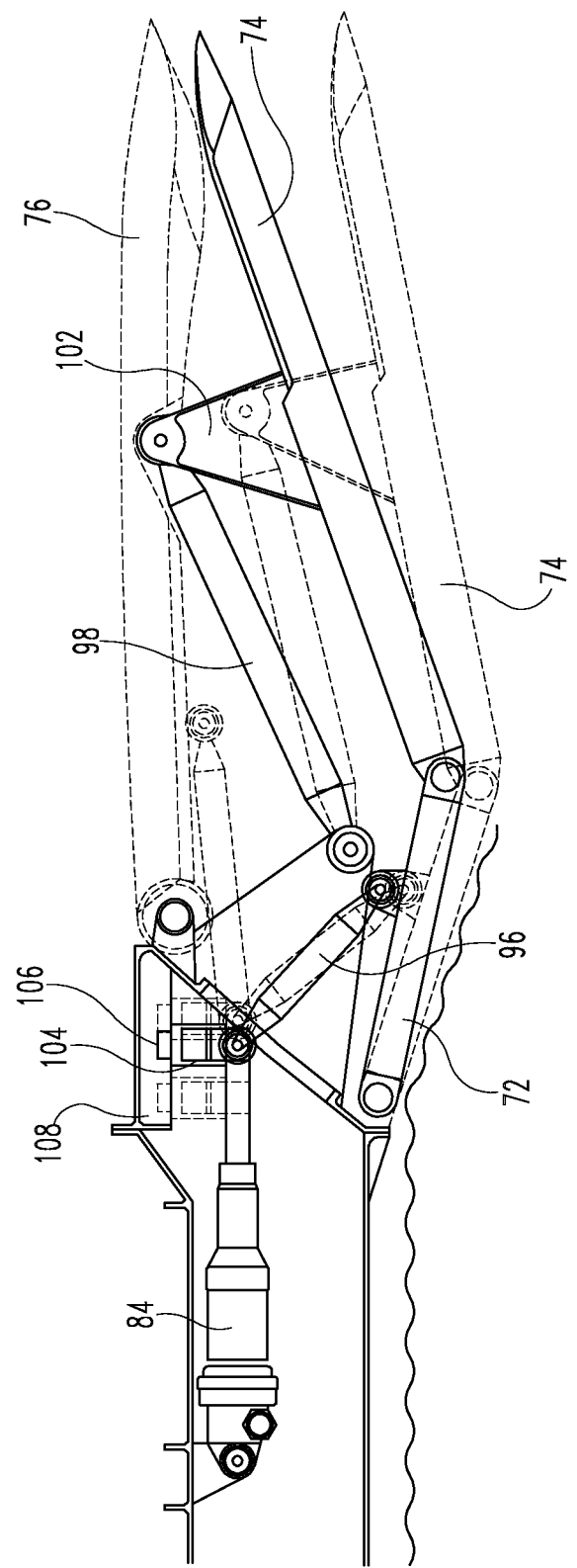
FIG. 5 depicts an embodiment of components of a nozzle.

FIGS. 4 and 5 depict one form of a mechanical arrangement of the nozzle 54 used in the gas turbine engine 52. The gas turbine engine 52 of the illustrative embodiment includes a core flow path 84 and a fan bypass path 86 which are merged to form an engine flow passage 88. The core flow path 84 is structured to convey a core flow stream from the gas turbine engine 52 and the fan bypass path 86 is structured to convey a fan bypass stream. The gas turbine engine 52 also includes an offtake flow passage 92 structured to convey an offtake flow of the engine 52. The gas turbine engine 52 of the illustrative embodiment also includes a bypass afterburning liner 90 in the engine flow passage 88 as well as a liner that moves with the exhaust upstream member 72. Not all embodiments of the gas turbine engine 52 need include the bypass afterburning liner 90 and/or the liner that moves with the exhaust upstream member 72.

The exhaust upstream member 72 and exhaust downstream member 74 are capable of being moved between positions via an actuator 94. The actuator 94 is coupled to the exhaust upstream member 72 via a connecting link 96. In one embodiment, the actuator 94 is a linear actuator, but, in other embodiments, the actuator 94 can take other forms such as a rotary actuator. The actuator can be capable of moving the connecting link 96 at a variety of rates and can place the exhaust upstream member 72 at a variety of positions. The actuator 94 can be an electric, hydraulic, or electromechanical actuator, among other possibilities. In some embodiments, the actuator 94 can receive an excitation or other command from the controller 57 based upon a variety of considerations, such as flight condition and engine power request, among other sensed, calculated, and/or commanded values.

The connecting link 96 is configured in the illustrative embodiment to be pivotally connected to an arm of the actuator 94 as well as to the exhaust upstream member 72. The connecting link 96 can have a variety of lengths and sizes and can be configured to be coupled to the exhaust upstream member 72 at a variety of offset distances.

The exhaust downstream member 74 is coupled to move with the exhaust upstream member 72 through an idler link 98. The idler link 98 is pivotally connected at one end to a structure 100 that, in one embodiment, is fixed relative to the gas turbine engine 52. The other end of the idler link 98 is pivotally connected to the exhaust downstream member 74. In the illustrative embodiment, the exhaust downstream member 74 includes the offset 102. The offset 102 can take a variety of forms such as integral to the exhaust downstream member 74 or a separate device fastened to the exhaust downstream member 74, among other possible variations. The offset 102 can be placed at a variety of locations relative to any of the components forming the nozzle 54.

In one embodiment of the nozzle 54, such as when it takes an axisymmetric nozzle form, a plurality of exhaust upstream members 72 can be connected to one or more actuators 94. In one embodiment, a plurality of actuators 94 can be connected to a plurality of exhaust upstream members 72. In yet a further embodiment, the numbers of actuators 94 can be different than the numbers of exhaust upstream members 72 to which they are attached. In one form, three actuators 94 are used and are positioned at different circumferential locations around an axisymmetric nozzle 54. In one non-limiting form, the actuators 94 are positioned 120 degrees apart from each other. The actuators 94 can be moved together during operation and can cause movement of the plurality of exhaust upstream members 72 via a commonly coupled unison ring 104. Similar movements of the actuators 94 permit the unison ring 104 to be moved concentric with a nozzle centerline, which in some embodiments can correspond to an engine centerline. Such movement in some embodiments can promote the nozzle members to be moved equally, or substantially equally.

The unison ring 104 extends circumferentially around the nozzle 54 and is coupled to a number of exhaust upstream members 72. In the illustrative form, the unison ring 104, exhaust upstream members 72, and actuator 94 are coupled at a common point, but, in other embodiments, the connections can be in different locations. To set forth just one non-limiting example, the actuator 94 can be coupled to the unison ring 104 at one location and the unison ring 104 can be coupled to the exhaust upstream member 72 at another location.

The unison ring 104 moves axially to alter the position of the exhaust upstream member 72. In some embodiments, the unison ring 104 can be moved axially through a translation motion or through a combination of rotation and translation. In the illustrative embodiment, the unison ring 104 moves within an axial track 108 from one position to another. In some embodiments, a single axial track 108 may extend circumferentially around the nozzle 54. In other embodiments, however, two or more different axial tracks 108 can be used.

FIG. 5 depicts motion of the nozzle assembly described in FIG. 4. The solid line depiction of the assembly illustrates a first position and the phantom depiction illustrates another. The two separate depictions illustrate just two of any number of other positions that are possible and are not meant to necessarily imply a minimum and a maximum.

Figure 6:
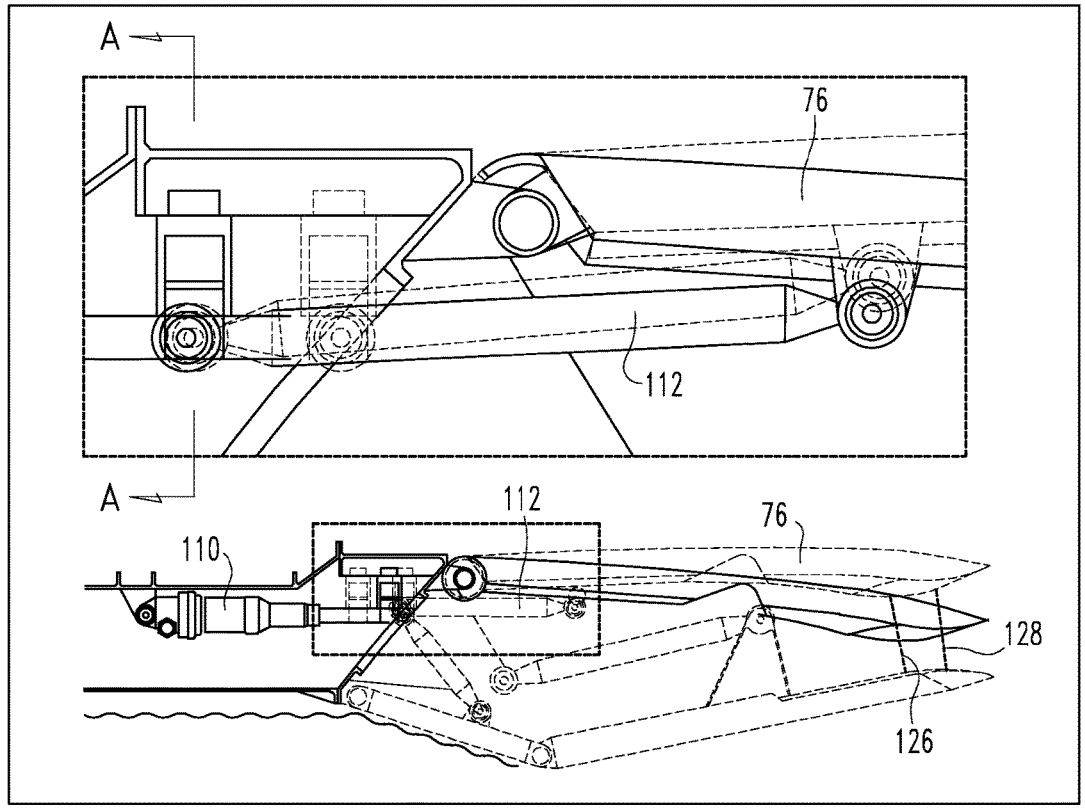
FIG. 6 depicts an embodiment of components of a nozzle.

Turning now to FIG. 6, a mechanism to change the position of the bypass member 76 is depicted. FIG. 6 depicts the mechanism in a first position in solid line form and in a second position in phantom line form. The two separate depictions illustrate just two of any number of other positions that are possible and are not meant to necessarily imply a minimum and a maximum. The mechanism in the embodiment depicted in FIG. 6 includes an actuator 110 coupled via a connecting arm 112 to the bypass member 76.

In one embodiment, the actuator 110 is a linear actuator, but, in other embodiments, the actuator 110 can take other forms such as a rotary actuator. The actuator 110 can be capable of moving the connecting link 112 at a variety of rates and can place the bypass member 76 at a variety of positions. The actuator 110 can be an electric, hydraulic, or electromechanical actuator, among other possibilities. In some embodiments, the actuator 110 can receive an excitation or other command from the controller 57 based upon a variety of considerations, such as flight condition and engine power request, among other sensed, calculated, and/or commanded values.

The connecting link 112 is configured in the illustrative embodiment to be pivotally connected to an arm of the actuator 110 as well as to the bypass member 76. The connecting link 112 can have a variety of lengths and sizes and can be configured to be coupled to the bypass member 76 at a variety of offset distances.

In one embodiment of the nozzle 54, such as when it takes an axisymmetric nozzle form, a plurality of bypass members 76 can be connected to one or more actuators 110. In one embodiment, a plurality of actuators 110 can be connected to a plurality of bypass members 76. In yet a further embodiment, the numbers of actuators 110 can be different than the numbers of bypass members 76 to which they are attached. In one form, three actuators 110 are used and are positioned at different circumferential locations around an axisymmetric nozzle 54. In one non-limiting form, the actuators 110 are positioned 120 degrees apart from each other. The actuators 110 can be moved together during operation and can cause movement of the plurality of bypass members 76 via a commonly coupled unison ring 116.

The unison ring 116 extends circumferentially around the nozzle 54 and is coupled to a number of bypass members 76. In the illustrative form, the unison ring 116, bypass member 76, and actuator 110 are coupled at a common point, but in other embodiments the connections can be in different locations. To set forth just one non-limiting example, the actuator 110 can be coupled to the unison ring 116 at one location and the unison ring 116 can be coupled to the bypass member 76 at another location.

The unison ring 116 moves axially to alter the position of the bypass member 76. In some embodiments, the unison ring 116 can be moved axially through a translation motion or through a combination of rotation and translation. In the illustrative embodiment, the unison ring 116 moves within an axial track 118 from one position to another. In some embodiments, a single axial track 118 may extend circumferentially around the nozzle 54. In other embodiments, however, two or more different axial tracks 118 can be used.

The unison ring 116 and the unison ring 104 can be capable of moving relative to a common axial track, such that the track 108 and track 118 are the same. It is not, however, required that the unison rings 116 and 104 move via the same track.

The bypass member 76 can have a recess 114 formed therein to accommodate a portion of the arrangement forming the engine flow passage 88. In the illustrative embodiment, the recess 114 is used to accommodate the offset 102 of the exhaust downstream member 74. The recess 114 can have a variety of sizes and shapes. If the embodiment of the nozzle 54 includes multiple members 72, 74, or 76, not all members need include a recess.

The shape of the bypass member 76 in conjunction with the exhaust downstream member 74 can form a throat area 126 and exit area 128. In some applications, the throat area is referred to as A18 and the exit area as A19.

Figure 7:
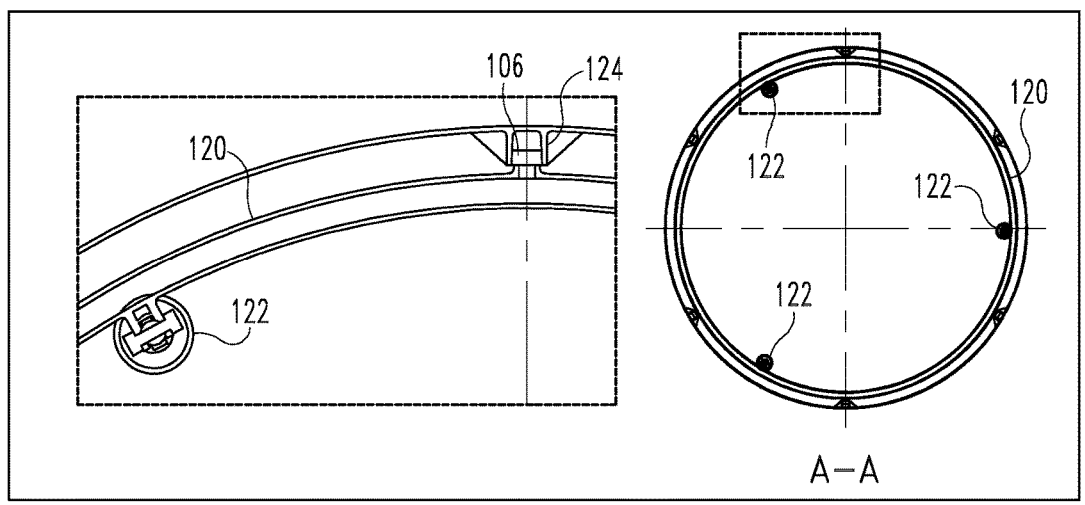
FIG. 7 depicts an embodiment of a nozzle component.

Turning now to FIG. 7, one embodiment of a unison ring 120 is depicted. Such a depiction can represent either or both of the unison rings 104 and 116. The unison ring 120 is shown from a view looking along the length of the flow paths through the nozzle 54 and includes an actuator 122, which can represent either or both actuators 94 and 110, and a number of rollers 106. The rollers 106 move within an axial track 124 to assist the unison ring 120 in moving from one position to another. In some embodiments, the axial track 124 can be, but need not be, either or both the axial tracks 108 and 118. It will be appreciated that not all embodiments need use rollers 106. The rollers 106 can be spaced circumferentially around the unison ring 120 at a variety of circumferential locations. In one particular embodiment, six rollers 106 are used.

In one non-limiting embodiment of the present application, mechanical articulation of the members that form the nozzle can be done independently for A8 and A18, with A9 dependent on A8 and A19 dependent on A18. Other variations are contemplated herein.

Figure 8:
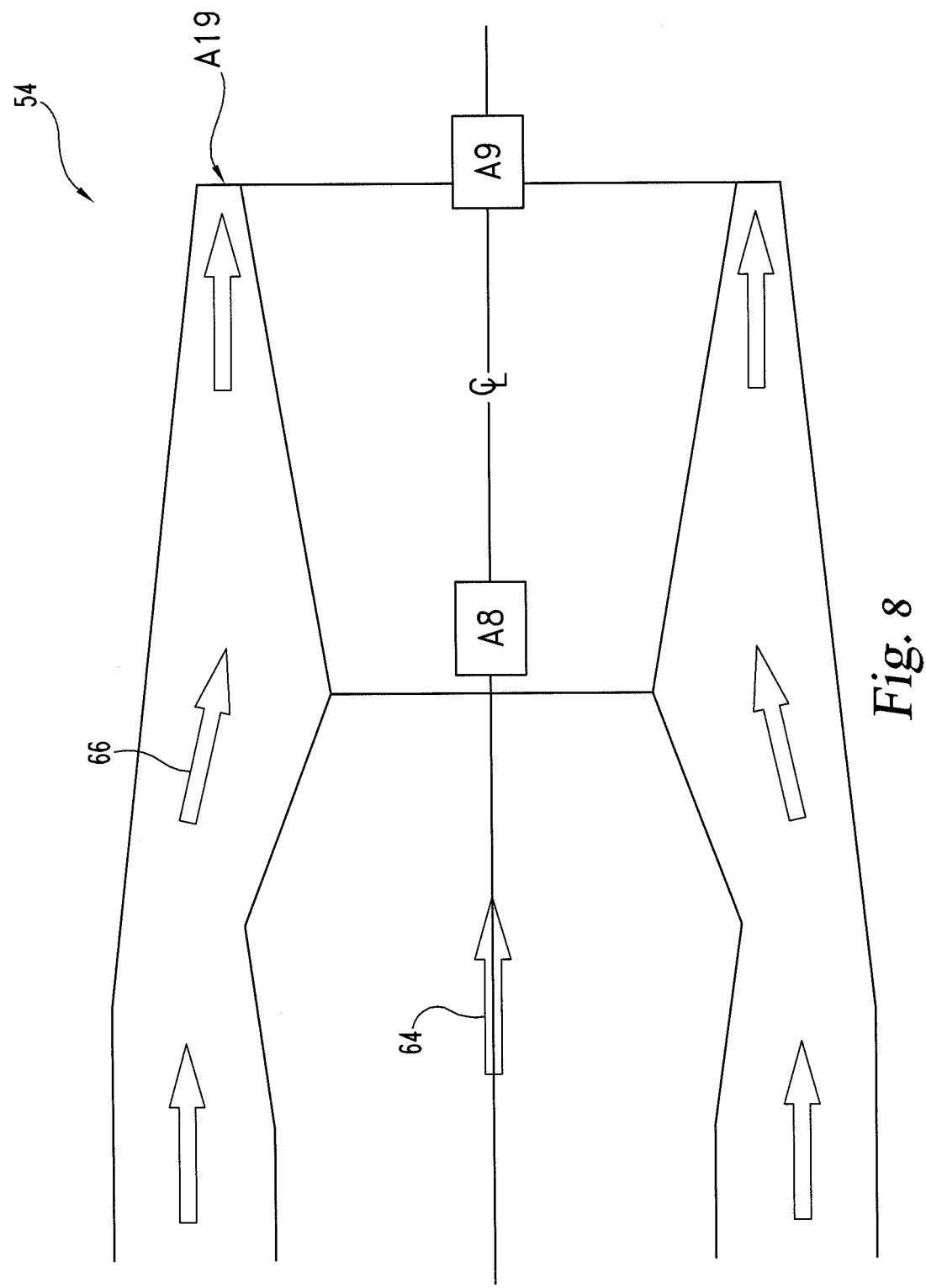
FIG. 8 illustrates an embodiment of a nozzle.

FIG. 8 illustrates an embodiment of the nozzle 54 that includes any of the structures discussed herein used to provide for articulation of the nozzle. In the non-limiting embodiment, the flow 64 represents a primary flow that includes a merger of core and bypass flow stream, and the flow 66 represents a third stream flow. As will be appreciated given the discussion above, the nozzle 54 integrates two separate nozzle functions, one for the core and bypass flow stream 64 and the other for the third stream flow 66.

One aspect of the present application provides an apparatus comprising an aircraft powerplant having a plurality of flow paths, a first flow path defined by a movable first flow path surface, and a second flow path radially outward of the first flow path and defined between a movable second flow path surface and a third flow path surface, the third flow path surface structured to move with movement of the movable first flow path surface.

A feature of the present application provides wherein a nozzle of the aircraft powerplant includes the plurality of flow paths, and wherein the nozzle is one of a 2D nozzle and an axisymmetric nozzle having a plurality of flaps.

Another feature of the present application further includes an aircraft having the aircraft powerplant.

Still another feature of the present application provides wherein the first flow path is a convergent-divergent section of an aircraft nozzle.

Yet still another feature of the present application provides wherein the second flow path includes a convergent-divergent geometry.

Still yet another feature of the present application provides wherein the movable first flow path surface forms part a divergent portion of a convergent-divergent flow section and is coupled at its upstream side to a fourth flow path surface, and which further includes an actuator coupled to move the fourth flow path surface, the first flow path surface slaved to move with movement of the fourth flow path surface.

Yet another feature of the present application further includes a plurality of movable first flow path surfaces and a plurality of movable second flow path surfaces, wherein a first actuator is coupled via a first sync ring to move the plurality of movable first flow path surfaces and a second actuator is coupled via a second sync ring to move the plurality of movable second flow path surfaces.

Another aspect of the present application provides an apparatus comprising an aircraft powerplant nozzle, a first nozzle flow path defined by a first flow path surface of a nozzle component and having a variable first nozzle area, and a second nozzle flow path radially outward of the first nozzle flow path and defined by a second flow path surface that moves with the nozzle component, the second nozzle flow path having a variable second nozzle area.

A feature of the present application provides wherein the variable second nozzle area is independently variable from the variable first nozzle area.

Another feature of the present application provides wherein the variable first nozzle area includes a variable throat area and a variable exit area.

Still another feature of the present application provides wherein the variable exit area changes with the variable throat area, and wherein the second nozzle flow path includes a throat area and an exit area.

Yet still another feature of the present application provides wherein the first nozzle flow path is structured to accept a flow including a core flow and the second nozzle flow path is structured to accept a bypass flow from a gas turbine engine, and wherein the first nozzle flow path and second nozzle flow path converge at a downstream end of the first flow path surface.

Still yet another feature of the present application provides wherein the nozzle component includes a plurality of nozzle components which are coupled to an actuator via an actuation ring.

A further feature of the present application provides wherein the second nozzle flow path includes a plurality of second nozzle components independently variable from the nozzle component.

Still another aspect of the present application provides an apparatus comprising a nozzle for a gas turbine engine, the nozzle having a first flow path including a plurality of first flaps and a second flow path located outwardly of the first flow path and having a plurality of second flaps, and means for synchronizing the plurality of first flaps of the first flow path.

A feature of the present application further includes means for coordinating a motion of the plurality of second flaps of the second flow path.

Yet a further aspect of the present application provides a method comprising operating a gas turbine engine to generate a bypass stream and an exhaust flow including a core flow, energizing an actuator to reconfigure a first flowpath surface and change an area of the exhaust flow, the energizing altering a position of a second flowpath surface of the bypass stream, and moving a third flowpath surface of the bypass stream to regulate an area of the bypass stream.

A feature of the present application further includes altering a throat and exit area of the exhaust flow, wherein the exhaust flow includes a fan bypass flow of the gas turbine engine.

Another feature of the present application further includes moving a plurality of axisymmetric nozzle flaps in unison to alter the throat and exit area of the exhaust flow, the axisymmetric nozzle flaps including the first flowpath surface.

Still another feature of the present application provides wherein the plurality of axisymmetric nozzle flaps includes a plurality of upstream flaps and a plurality of downstream flaps, and which further includes dependently altering the exit area of the exhaust flow on the basis of an actuation movement of the plurality of upstream flaps.

Yet still another feature of the present application provides wherein the moving includes changing an axial location of a ring coupled to the third flowpath surface.

Still yet another feature of the present application provides wherein the area of the bypass stream includes a throat area and an exit area, and which further includes varying a throat and exit area of the bypass stream.

A further feature of the present application provides wherein the bypass stream is an offtake from a fan flow of a gas turbine engine.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an aircraft powerplant having a plurality of flow paths;
a first flow path of the plurality defined by a movable first member; and
a second flow path of the plurality radially outward of the first flow path and defined between a movable second member and a moveable third member, the movable third member is articulably coupled to a downstream end of the moveable first member, the movable third member structured to move with movement of the movable first member,
wherein the moveable first member comprises a plurality of movable first flaps and the moveable second member comprises a plurality of movable second flaps, and a first actuator is coupled with a first sync ring to move the plurality of movable first flaps and a second actuator is coupled with a second sync ring to move the plurality of movable second flaps independently relative to the moveable first member, and wherein a variable nozzle area of the second flow path is configured to form a convergent-divergent geometry.

2. The apparatus of claim 1, wherein a nozzle of the aircraft powerplant includes the plurality of flow paths, and wherein the nozzle is one of a 2D nozzle and an axisymmetric nozzle.

3. The apparatus of claim 2, further comprising an aircraft having the aircraft powerplant.

4. The apparatus of claim 2, wherein the first flow path is a convergent-divergent section of the nozzle of the aircraft powerplant.

5. The apparatus of claim 1, wherein the first flow path comprises a first nozzle flow path defined by at least one of the first and third movable members having a variable first nozzle area, and the variable nozzle area of the second flow path is independently variable from the First variable nozzle area.

6. The apparatus of claim 5, wherein the variable first nozzle area includes a variable throat area and a variable exit area.

7. The apparatus of claim 6, wherein the variable exit area changes with the variable throat area, and wherein the convergent-divergent geometry includes a throat area and an exit area.

8. The apparatus of claim 5, wherein the first nozzle flow path is structured to accept a flow including a core flow and the second nozzle flow path is structured to accept a bypass flow from the power plant.

9. The apparatus of claim 1, wherein the movable second member is arranged radially outward of the movable third member.

10. An apparatus comprising:
an aircraft powerplant nozzle;
a first nozzle flow path including a first nozzle component, the first nozzle component having a plurality of first flaps that define at least a portion of a variable first nozzle area;
a second nozzle flow path radially outward of the first nozzle flow path and defined between a second nozzle component and a third nozzle component articulably coupled with a downstream end of the first nozzle component and defining at least another portion of the variable first nozzle area, the second nozzle component having a plurality of second flaps that define a variable second nozzle area of the second flow path,
at least one first actuator configured to move the first nozzle component,
at least one second actuator configured to move the second nozzle component,
means for synchronizing the plurality of first flaps of the first nozzle component, and
means for coordinating a motion of the plurality of second flaps of the second flow nozzle component independently relative to the first nozzle component, and wherein the variable second nozzle area or the second flow path is configured to form a convergent-divergent geometry.

11. The apparatus of claim 10, wherein the variable second nozzle area is independently variable from the variable first nozzle area.

12. The apparatus of claim 10, wherein the variable first nozzle area includes a variable throat area and a variable exit area.

13. The apparatus of claim 12, wherein the variable exit area changes with the variable throat area, and wherein the convergent-divergent geometry includes a throat area and an exit area.

14. The apparatus of claim 10, wherein the first nozzle flow path is structured to accept a flow including a core flow and the second nozzle flow path is structured to accept a bypass flow from a gas turbine engine.

15. The apparatus of claim 10, wherein the means for synchronizing the plurality of first flaps includes an actuation ring coupled between the at least one first actuator and the plurality of first flaps.

16. The apparatus of claim 10, wherein the means for coordinating the plurality of second flaps includes an actuation ring coupled between the at least one second actuator and the plurality of second flaps.

17. The apparatus of claim 10, wherein the second nozzle component is arranged radially outward of the third nozzle component.

18. An apparatus of an aircraft comprising:
an aircraft powerplant having a plurality of flow paths;
a first flow path of the plurality defined by a movable upstream member; and
a second flow path of the plurality radially outward of the first flow path and defined between a movable flow member and a moveable downstream member, the movable downstream member is articulably coupled to a downstream end of the moveable upstream member and is structured to move with movement of the movable upstream member,
wherein the moveable upstream member comprises a plurality of upstream movable flaps, and an actuator coupled with a sync ring to move the plurality of upstream movable flaps,
wherein the moveable flow member comprises a plurality of movable flaps, and another actuator coupled with another sync ring to move the plurality of movable flaps independently relative to the moveable upstream member, and
wherein a variable nozzle area of the second flow path is configured to form a convergent-divergent geometry.

19. The apparatus of claim 18, wherein the movable flow member is arranged radially outward of the movable downstream member.

* * * * *